(12) United States Patent
Zappa et al.

(10) Patent No.: US 11,084,547 B2
(45) Date of Patent: Aug. 10, 2021

(54) ATTACHMENT APPARATUS AND/OR SYSTEM FOR SECURELY ATTACHING OBJECTS TO A BICYCLE FRAME

(71) Applicant: ZAPPAWHEELS LLC, Chicago, IL (US)

(72) Inventors: John Zappa, Chicago, IL (US); Marta Guerrero Merino, Chicago, IL (US); David Lopez Alonso, Denver, CO (US); Alejandro Herrera Perdomo, Chicago, IL (US); Thomas Chiang, Glencoe, IL (US); David Filicicchia, West Chicago, IL (US); David Zappa, Wexford, PA (US)

( * ) Notice: Subject to any disclaimer, the term of this patent is extended or adjusted under 35 U.S.C. 154(b) by 68 days.

(21) Appl. No.: 16/698,672

(22) Filed: Nov. 27, 2019

(65) Prior Publication Data

US 2021/0155309 A1 May 27, 2021

(51) Int. Cl.
*B62J 7/04* (2006.01)
*B62J 7/08* (2006.01)
*B62J 9/26* (2020.01)

(52) U.S. Cl.
CPC . *B62J 7/04* (2013.01); *B62J 7/08* (2013.01); *B62J 9/26* (2020.02)

(58) Field of Classification Search
CPC ......... B62J 7/04; B62J 7/08; B62J 9/26; B62J 9/00; B62H 2005/008
USPC .......................... 224/935, 419, 421, 415, 430
See application file for complete search history.

(56) References Cited

U.S. PATENT DOCUMENTS

| 5,251,796 A | * | 10/1993 | Shelhart | B62H 5/00 224/422 |
| 5,395,016 A | * | 3/1995 | Minoura | B62H 5/00 224/419 |
| 6,209,941 B1 | * | 4/2001 | Cross | B62J 9/00 224/426 |
| 7,815,082 B1 | * | 10/2010 | Arnone | B62J 7/04 224/427 |
| 2010/0170924 A1 | * | 7/2010 | Johnson | B62J 7/08 224/413 |

* cited by examiner

*Primary Examiner* — Nathan J Newhouse
*Assistant Examiner* — Lester L Vanterpool
(74) *Attorney, Agent, or Firm* — Eugenio J. Torres-Oyola; Victor M. Rodriguez-Reyes; Rafael Rodriguez-Reyes

(57) ABSTRACT

The present disclosure is directed to an attachment apparatus and/or system for securely attaching objects to a bicycle frame that comprises a transport platform that is attachable to the top of a bicycle rack.

15 Claims, 9 Drawing Sheets

ATTACHMENT APPARATUS AND/OR SYSTEM FOR SECURELY ATTACHING OBJECTS TO A BICYCLE FRAME

STATEMENT REGARDING FEDERALLY SPONSORED RESEARCH AND DEVELOPMENT

N/A

RELATED APPLICATIONS

N/A

BACKGROUND OF THE DISCLOSURE

Field of the Invention

The present application relates to an attachment apparatus and/or system for securely attaching objects to a bicycle frame.

BACKGROUND

Bicycle commuting is an increasingly popular form of urban transportation. A common challenge with bicycle commuting, however, is transporting personal belongings while riding. For instance, a rider may have a u-lock, keys, phone, wallet, money, spare tube, patch kit and other items. All these possessions need to be easily secured without encumbering the rider or compromising his/her safety.

U-shaped locks present a special challenge since it is heavy, relatively large, an unusual shape and in many instances dirty. Traditional forms of carrying U-shaped locks, such as plastic brackets, require the rider to fit the lock to the bracket each time, they want to transport the lock. The bracket also takes up valuable space on the frame of the bike usually requiring the rider to give up a water bottle mount. Made from plastic, the brackets inevitable break from all the vibration typically present in riding a bike. Additionally, available methods of carrying U-shaped locks do not hold them in place in the x, y and z dimensions, thus permitting them to move and rattle.

Some riders use a bungee cord to secure the lock to a rack mounted on the rear of the bike. This again takes time to secure the lock and most annoyingly, the lock, which is metal bounces on the metal rack, thereby creating a rattling noise during the entire ride. Other riders have resorted to looping the lock over their front handlebars, which is an inherently dangerous situation given the movement of a large metal object inches from the rider's face and body.

Accordingly, there is a need for an attachment apparatus and/or system for securely attaching objects to a bicycle frame that has the capability of holding said objects in place, thus preventing them from moving and rattling. Additionally, there is a need for such an apparatus and/or system that is also durable, easy to use, does not take up too much space, does not compromise the safety of the rider; and does not impede the rider's movements.

While certain aspects of conventional technologies have been discussed to facilitate disclosure of the invention, Applicant in no way disclaims these technical aspects, and it is contemplated that the claimed invention may encompass one or more of the conventional technical aspects discussed herein. In this specification where a document, act, or item of knowledge is referred to or discussed, this reference or discussion is not an admission that the document, act, or item of knowledge or any combination thereof was at the priority date, publicly available, known to the public, part of common general knowledge, or otherwise constitutes prior art under the applicable statutory provision; or is known to be relevant to an attempt to solve any problem with which this specification is concerned.

SUMMARY

The present disclosure relates to an attachment apparatus and/or system for securely attaching objects to a bicycle frame that comprises a transport platform that is attachable to the top of a bicycle rack, wherein the platform comprises a rectangular base with raised edges around its perimeter; and a rectangular rail that extends from the side of the rectangular base. Additionally, the platform comprises a connecting strap that is secured to the platform in at least two spots, via snap fasteners and is also connected to the bottom of the rack by looping over the ends. Such configuration of the connecting straps, in combination with the rails extending from the base, creates a triangular shape that is capable of holding an object (such as a U-shaped lock) in place in the x, y and z dimensions, thus preventing the object from moving and rattling. Moreover, the platform also supports additional attachments, such as locking or storage containers, via snap fasteners; and includes holes that can be used to secure the platform to the rack with zip ties (or any equivalent thereof) or as drainage.

The present disclosure may address one or more of the problems and deficiencies of the prior art discussed above. However, it is contemplated that the disclosure may prove useful in addressing other problems and deficiencies in a number of technical areas. Therefore, the claimed invention should not necessarily be construed as limited to addressing any of the particular problems or deficiencies discussed herein.

BRIEF DESCRIPTION OF THE DRAWINGS

These and other features, aspects, and advantages of the present invention will become better understood with regard to the following description, appended claims and accompanying drawings where:

DETAILED DESCRIPTION

Figure 1:
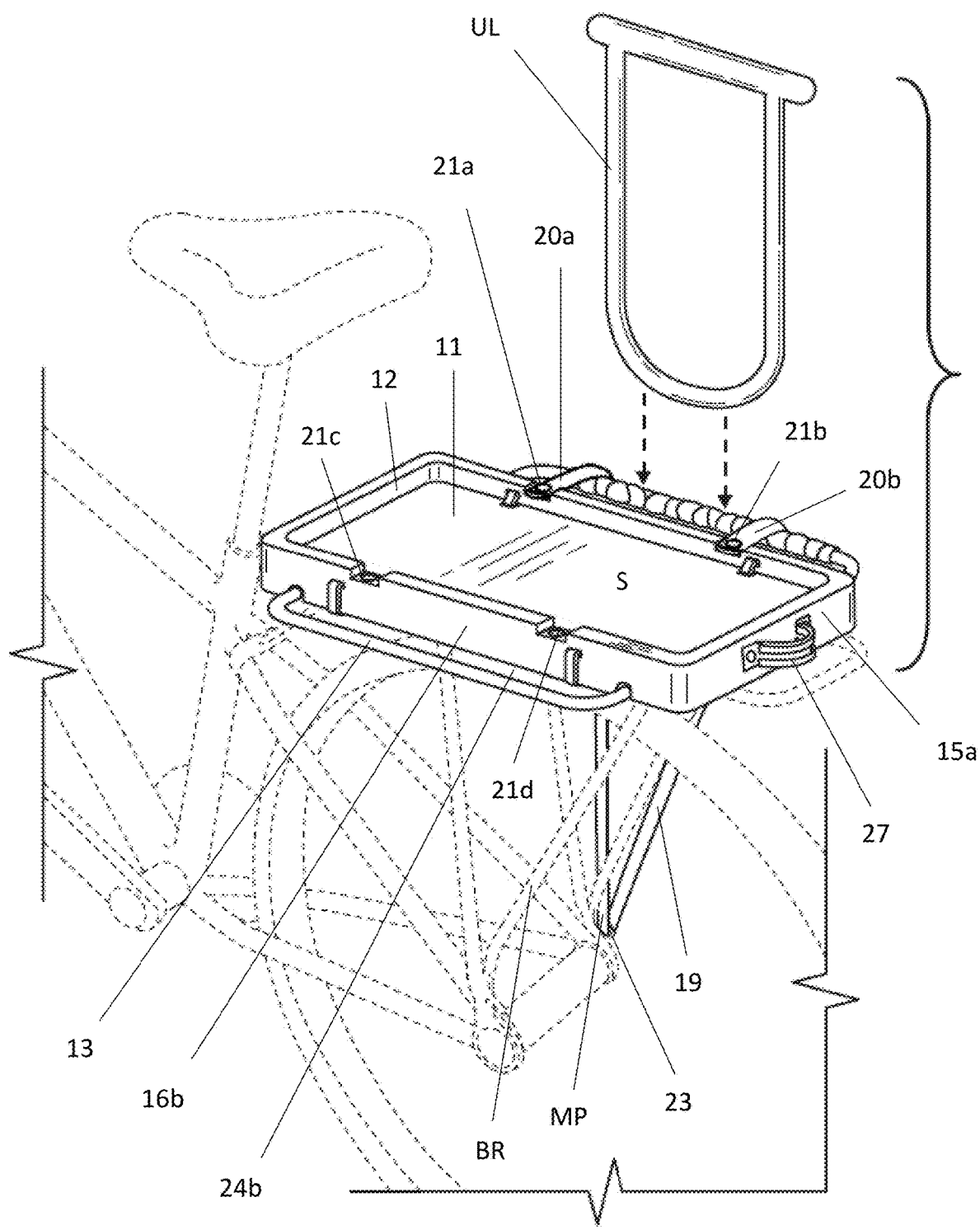
FIG. 1 shows a left-side perspective view of the attachment apparatus and/or system for securely attaching objects to a bicycle frame, in accordance with principles of the present disclosure.

In the Summary above, the Description below, and in the accompanying drawings, reference is made to particular features of the present disclosure. It is to be understood that the disclosure includes possible combinations of such particular features. For example, where a particular feature is disclosed in the context of a particular aspect or exemplary embodiment, or a particular claim, that feature can also be used, to the extent possible, in combination with and/or in the context of other particular aspects and exemplary embodiments, and in the invention generally.

The term "comprises" and grammatical equivalents thereof are used herein to mean that other components, structures, steps, etc. are optionally present. For example, an article "comprising" (or "which comprises") components A, B, and C can consist of (i.e., contain only) components A, B, and C, or can contain not only components A, B, and C, but also one or more other components or structures.

The term "at least" followed by a number is used herein to denote the start of a range beginning with that number (which may be a range having an upper limit or no upper limit, depending on the variable being defined). For example, "at least 1" means 1 and/or more than 1.

The term "mechanical features" or "mechanical coupled" is used herein to mean features of a component, mechanical or geometric, which have a functional purpose of attaching or linking that component to one or more other components with compatible or corresponding mechanical features. An example of a mechanical feature is a slot in a component, where said slot is designed to accept a tab from another component and the union of the slot and tab from the two components effectively links, attaches, fixes, and/or locks the components together. The term "mechanical features" refers to, but is not limited to: clips, hooks, hook and loop fasteners, slot and tabs, all male and female fasteners, screws, bolts, nuts, holes that have been tapped, latches, pins, etc.

While the specification will conclude defining the features of exemplary embodiments of the disclosure that are regarded as novel, it is believed that the disclosure will be better understood from a consideration of the following description in conjunction with the figures, in which like reference numerals are carried forward.

FIG. 1 shows a left-side perspective view of the attachment apparatus and/or system for securely attaching objects to a bicycle frame, in accordance with principles of the present disclosure. The attachment apparatus and/or system for securely attaching objects to a bicycle frame comprises a transport platform 10 that is configured to be attached to the top of a bicycle rack BR. The transport platform 10, in turn, comprises a base 11 with raised edges 12 around its entire perimeter; and a rail 13 that extends from two sides of the base 11. The base 11 is preferably rectangular in shape and has rounded edges; but may also be configured to have any other shape. In a preferred embodiment, the base 11 includes a first end 15a and a second end 15b that are parallel to each other and have the same length; a first side 16a and a second side 16b that are parallel to each other and have the same length; wherein the length of the first and second sides 16a, 16b is greater that the length of the first and second ends 15a, 15b. The base 11 further comprises one or more holes 14a-141 that cross through the surface S or sides 16a, 16b of the base 11. that may be used to 1) either secure the transport platform 10 to the bicycle rack BR via one or more zip ties ZT; or 2) to serve as drainage for the base 11, in the event that water accumulates on the top surface of the base 11. The one or more holes 14a-141, are preferably located on the first and second sides 16a, 16b of the base 11 and on a corresponding nearby location on the surface S of the base 11 to allow for the tying of the base 11 to the bicycle rack BR via zip ties ZT or any equivalent thereof, including, but not limited to, cable ties. In other words, the one or more holes on the surface S of the base 11 should be adjacent to the corresponding one or more holes on the first and second sides 16a, 16b of the base 11 in order to facilitate the tying of the base 11 to the bicycle rack BR via zip ties ZT. It should be noted that holes 14a-141 may be used for both drainage and securing of the base 11 to the bicycle rack BR. It must also be noted that the base 11 can be manufactured from metal, plastic or any other durable material with similar properties.

Figure 7A:
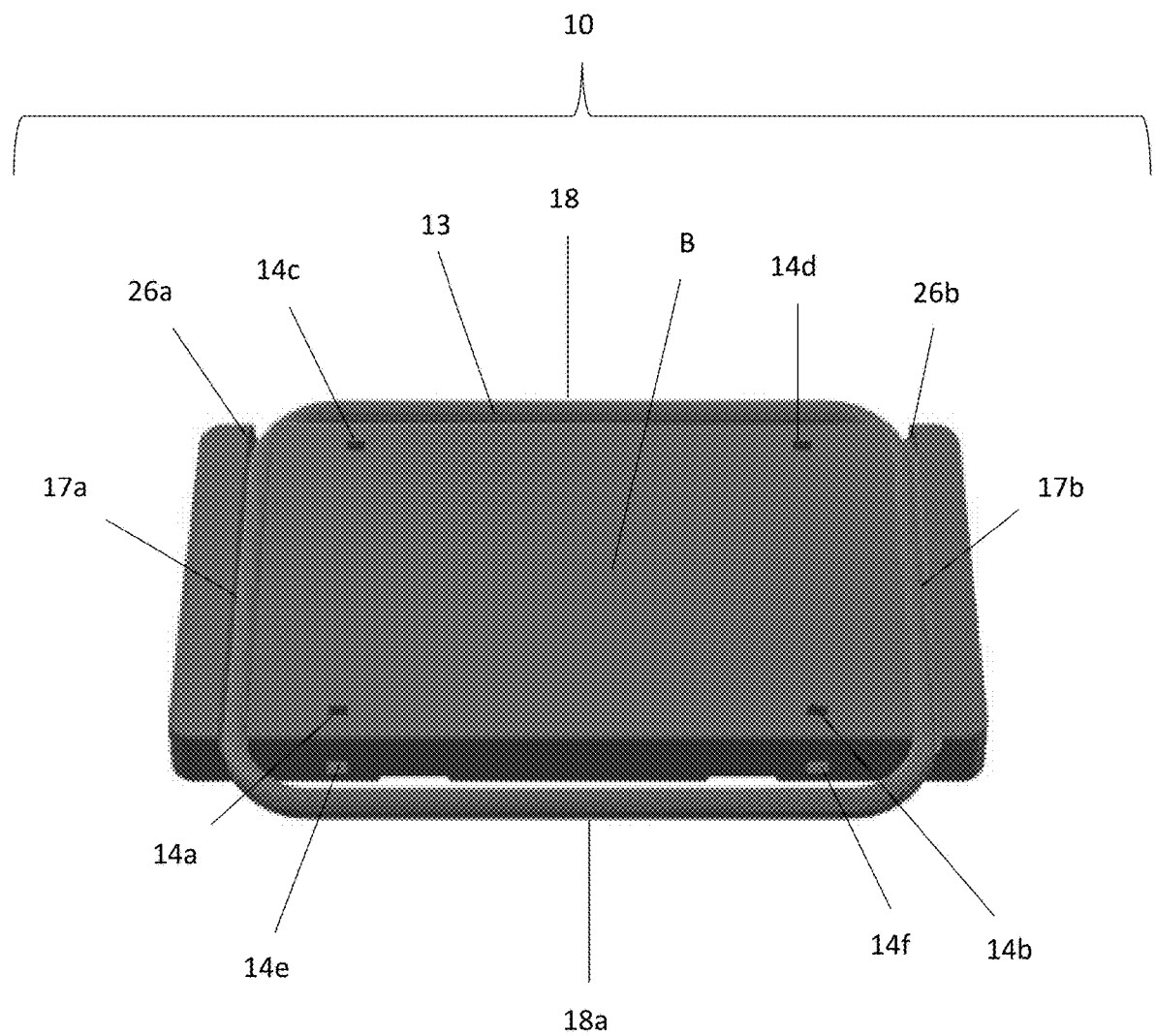
FIG. 7A shows a bottom view of the transport platform component of the attachment apparatus and/or system for securely attaching objects to a bicycle frame, in accordance with principles of the present disclosure.
Figure 7B:
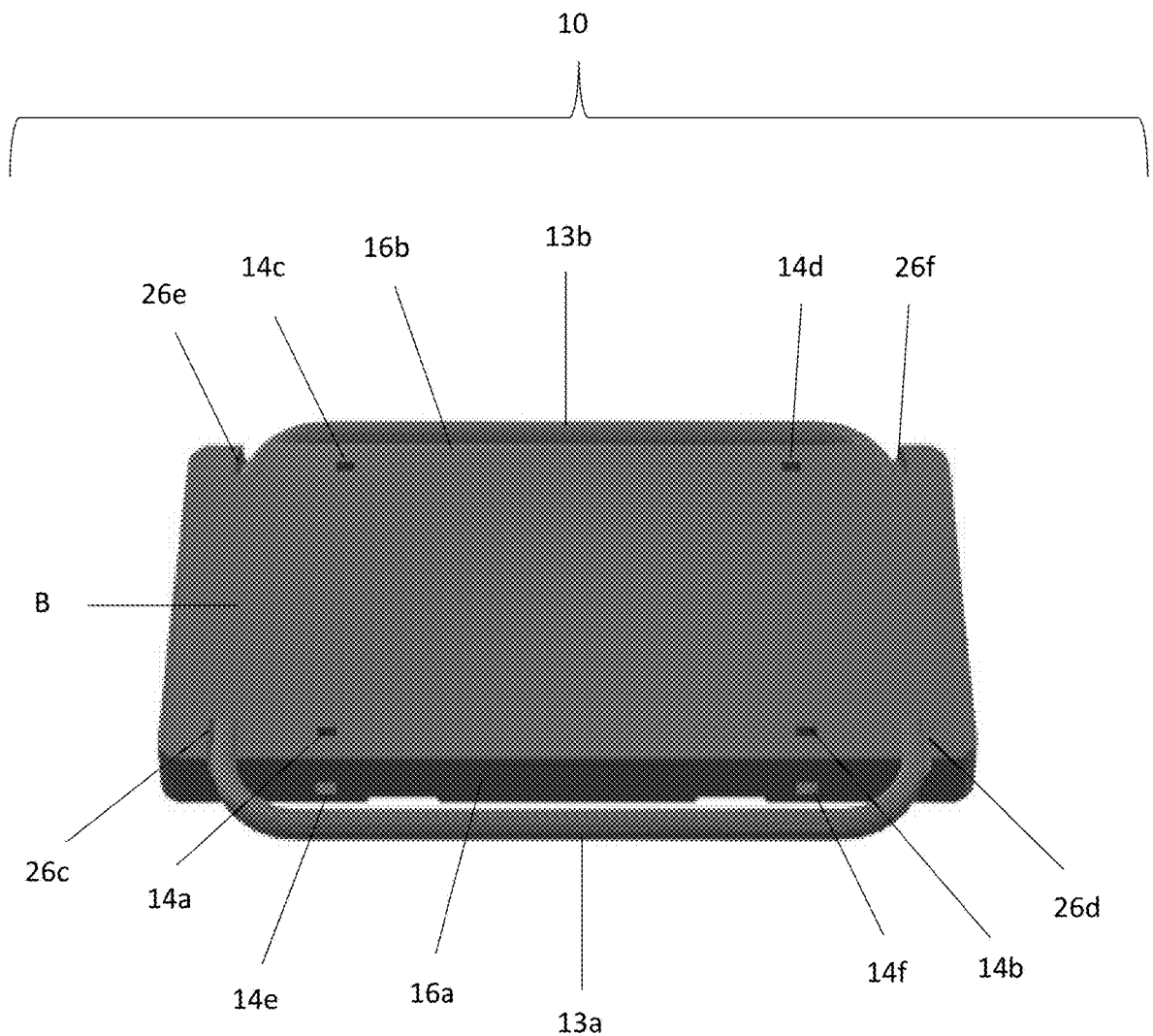
FIG. 7B shows a bottom view of another embodiment of the transport platform component of the attachment apparatus and/or system for securely attaching objects to a bicycle frame, in accordance with principles of the present disclosure.

Similarly, the rail 13 is preferably rectangular in shape with rounded edges; but may also have any other shape. The rail 13 can be manufactured from aluminum, plastic or any other durable material with similar properties. As shown in FIG. 7A, the rail 13 is preferably a single piece that is mechanically inserted or fitted into grooves 26a, 26b at the bottom B of the base 11. This configuration holds the base 11 in place and prevents it from rattling or moving. Notwithstanding, the attachment apparatus and/or system for securely attaching objects to a bicycle frame may also be configured to have one rail 13a attached to the base 11 via grooves 26c, 26d on the first side 16a of the base 11; and another rail 13b attached to the base 11 via grooves 26e, 26f on the second side 16b of the base 11, as shown in FIG. 7B. Lastly, it must be noted that the groves 26a, 26b or 26c, 26d may, but do not have to be, symmetric with each other.

In a preferred embodiment, the rail 13 includes a first end 17a and a second end 17b that are parallel to each other and have the same length; a first side 18a and a second side 18b that are parallel to each other and have the same length; wherein the length of the first and second sides 18a, 18b is greater that the length of the first and second ends 17a, 17b. Additionally, the first and second sides 18a, 18b of the rail 13 protrude or extend beyond the perimeter of the first and second sides 16a, 16b of the base 11, thus creating a cavity or opening 24a, 24b between the corresponding first and second sides 16a, 16b of the base 11 and the corresponding first and second sides 18a, 18b of the rail 13. It must be noted, that in some embodiments the distance between the first and second sides 16a, 16b of the base 11 and the first and second sides 18a, 18b of the rail 13 must be smaller than the width of the handle of the U-shaped lock UL. Such configuration is necessary to prevent the U-shaped lock UL from falling through the cavity or opening 24a, 24b. Notwithstanding, the cavity or opening 24a, 24b between the corresponding first and second sides 16a, 16b of the base 11 and the corresponding first and second sides 18a, 18b of the rail 13, does not have to be symmetrical in size with each other. That is, the size of the cavity or opening 24a may be bigger than the size of the cavity or opening 24b and vice versa. Lastly, the first and second sides 18a, 18b of the rail 13 may include a strap ST that provides friction to the rail 13 and thus, provides further stability by preventing the U-shaped lock UL from moving and/or rattling. The strap ST may be manufactured from rubber, leather or any other material with a high coefficient of friction.

Figure 2:
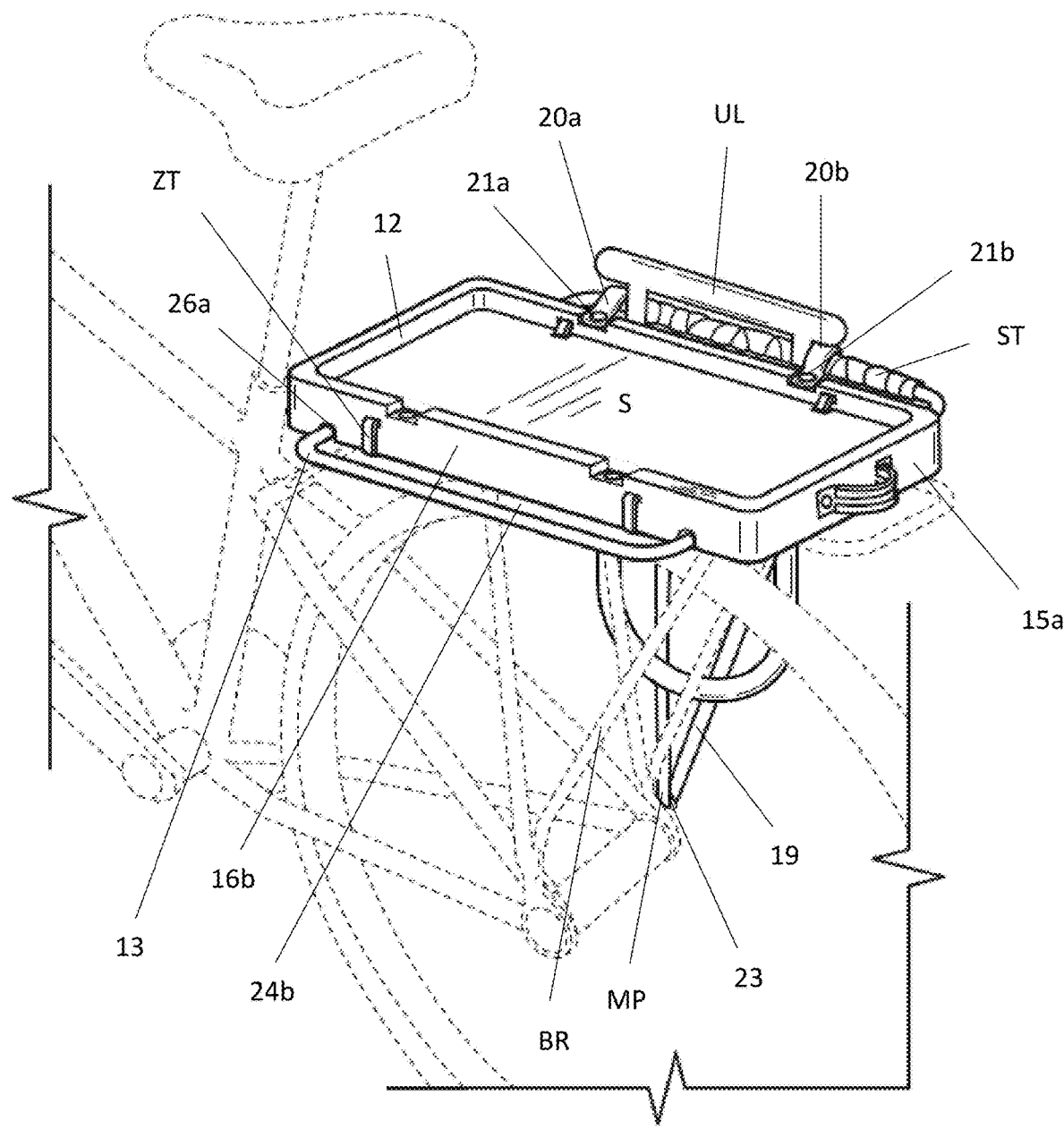
FIG. 2 shows a U-shaped lock attached to the right-side of the transport platform component of the attachment apparatus and/or system for securely attaching objects to a bicycle frame, in accordance with principles of the present disclosure
Figure 3:
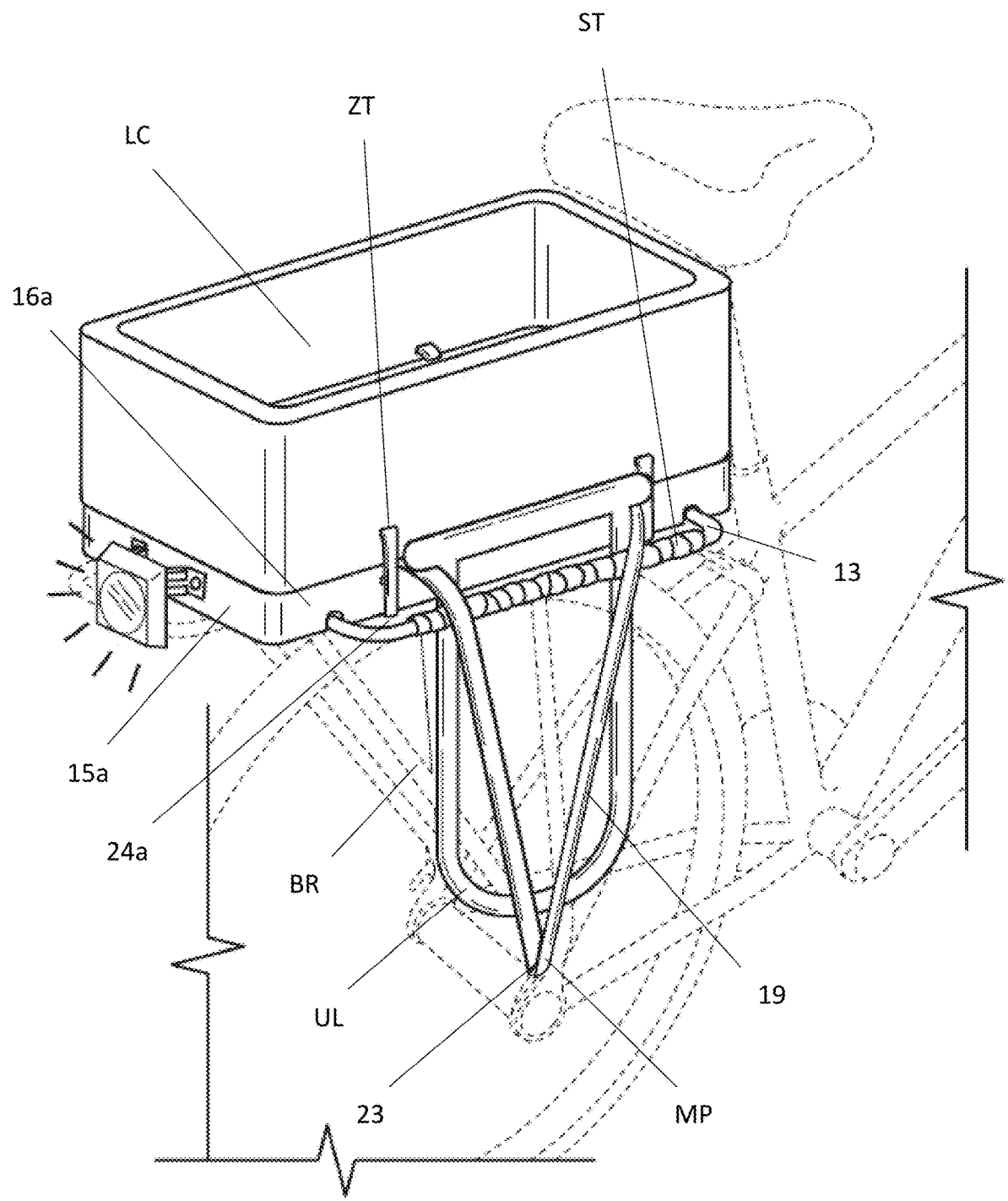
FIG. 3 shows a right-side perspective view of the attachment apparatus and/or system for securely attaching objects to a bicycle frame having an object attached to top of the transport platform component of said attachment apparatus and/or system, in accordance with principles of the present disclosure.

As shown in FIGS. 1-3, the attachment apparatus and/or system for securely attaching objects to a bicycle frame also comprises at least one connecting strap 19, having a first end 20a, and a second end 20b opposite to each other. The first end 20a of the connecting strap 19 is fastened to the base 11 via snap fastener 21a. The second end 20b is then looped over an attachment point 23 (i.e., any lower portion of the bicycle rack that may serve as support for the connecting strap) in the bicycle rack BR such that the midpoint MP of the connecting strap 19 is securely attached to the bicycle rack BR. The second end 20b is then fastened to the base 11 via snap fastener 21b. It should be noted that the first end 20a and second end 20b of the connecting strap 19 are both folded over the rail 13 (i.e., they are not inserted through the cavity 24a, 24b) while being snapped into the corresponding snap fasteners 21a, 21b. This creates a triangular shape, akin to a holster, which holds the U-shaped lock UL in place in the x, y and z dimensions, thus preventing said lock from moving and rattling. The connecting strap 19 may be manufactured from any material that is foldable and durable, such as, but not limited to, rubber, leather or any other material with a high co-efficient of friction. Alternatively, instead of fastening the second end 20b to the base 11 via snap fastener 21b, the second end 20b may be fastened to the base 11 via snap fastener 21d. This configuration allows the connecting strap 19 to work as a bungee cord like device to secure objects on the surface S of the base 11 of the platform for transport 10.

Accordingly, the shape of the transport platform 10, with a rail 13 that protrudes from the side of the base 11, creates a cavity or opening 24 that holds an object when the transport platform 10 is mounted on a bicycle rack BR. The connecting strap 19 will then firmly secure the U-shaped lock UL in place. To retrieve the U-shaped lock UL, the cyclist would only need to pull U-shaped lock UL out of the cavity or opening 24. It should be noted that the snap fasteners 21a, 21b, 21c, 21d are preferably mounted on the raised edges 12 of the base but may also be mounted on the first and second sides 16a, 16b of the base 11; or on the first and second ends 15a, 15b of the base; or on both.

Figure 4:
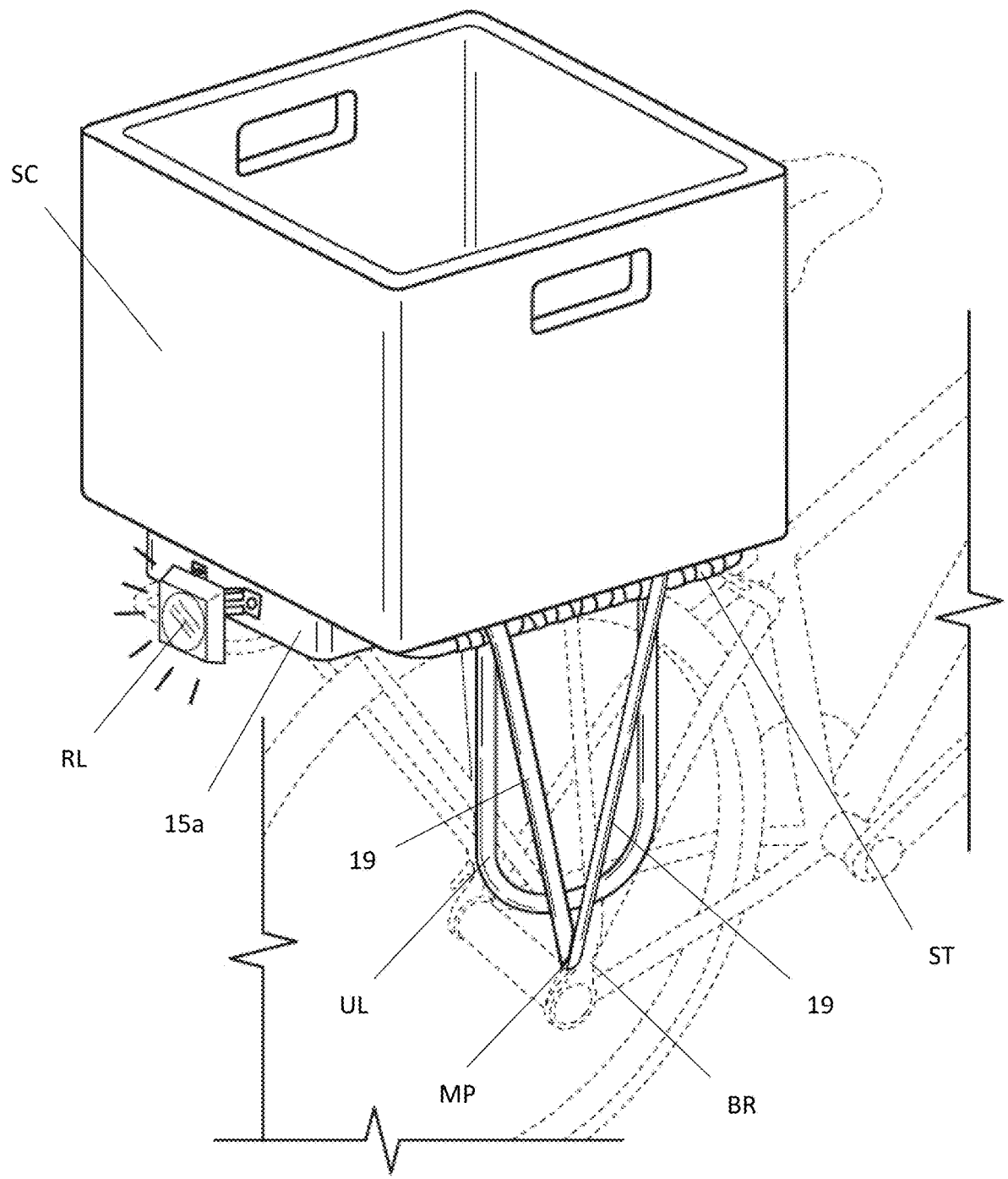
FIG. 4 shows a right-side perspective view of the attachment apparatus and/or system for securely attaching objects to a bicycle frame having a different object attached to top of the transport platform component of said attachment apparatus and/or system, in accordance with principles of the present disclosure.

As shown in FIGS. 3-4, attachments like locking containers LC or storage containers SC of various sizes, lights, solar-panel chargers, etc., can be snapped via the snap fasteners 21a, 21b, 21c, 21d onto the transport platform 10. This modular approach supports all sorts of attachments including ones that support additional storage for hauling groceries or other items.

Figure 5:
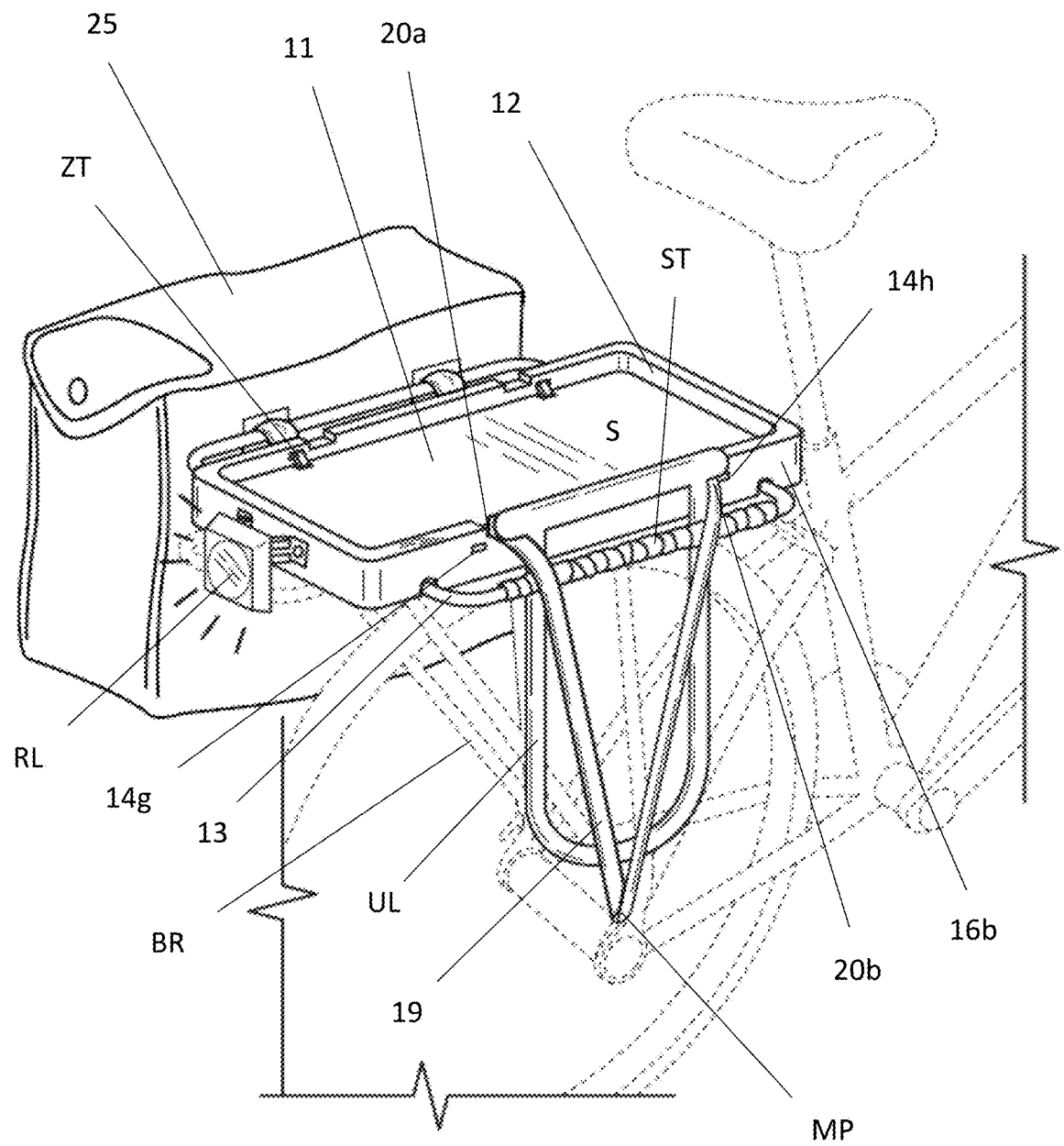
FIG. 5 shows a U-shaped lock attached to the right-side of the transport platform and supported by connecting straps as well as a pannier bag attached to the left-side of the transport platform, in accordance with principles of the present disclosure.
Figure 6:
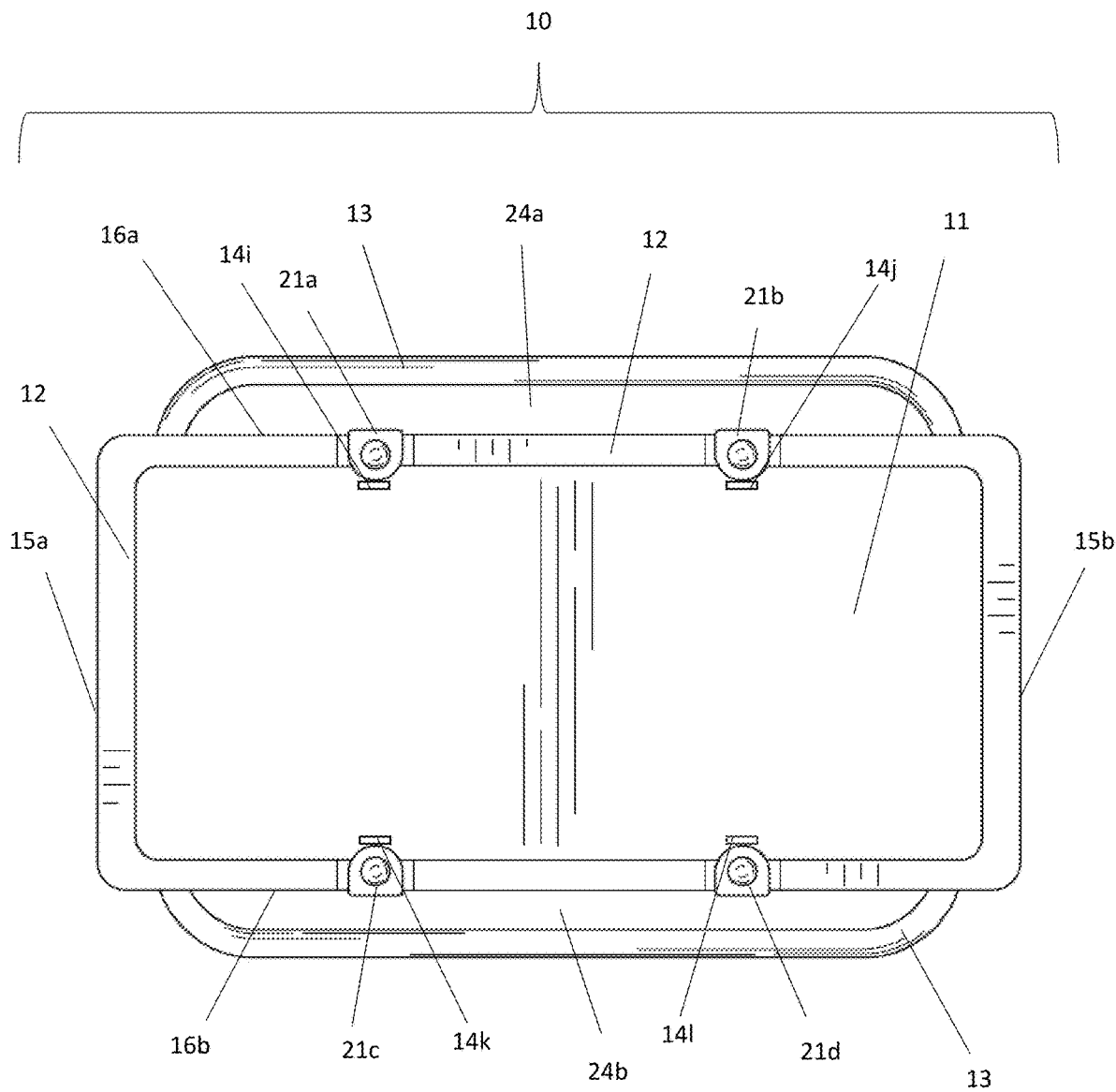
FIG. 6 shows a top view of the transport platform component of the attachment apparatus and/or system for securely attaching objects to a bicycle frame, in accordance with principles of the present disclosure.

As shown in FIG. 5, the transport platform 10 also enables the rider to mount saddlebags or panniers 25. The side rails on the transport platform 10 permit the use of saddle bags or panniers 25 on one or both sides of the base 11, unlike other systems that support storage on top of the rack and prevent the use of saddlebags. Moreover, the existing functionality of the bicycle rack BR is not compromised with the attachment apparatus and/or system for securely attaching objects to a bicycle frame. For example, a light bracket 27 may be mounted on the first end 15a of the base 11 so that riders can also attach a rear light RL for visibility.

As shown in FIGS. 1, 2, 5, and 6, and as previously discussed, the base 11 also comprises a raised edge 12 around the entire perimeter of said base 11. This raised edge 12 ensures that objects placed on the top of the base 11 do not slide off the transport platform 10. In effect, it provides a passive way to secure objects on the transport platform 10. Coupled with a bungee cord, the object would be securely held in place.

Figure 8:
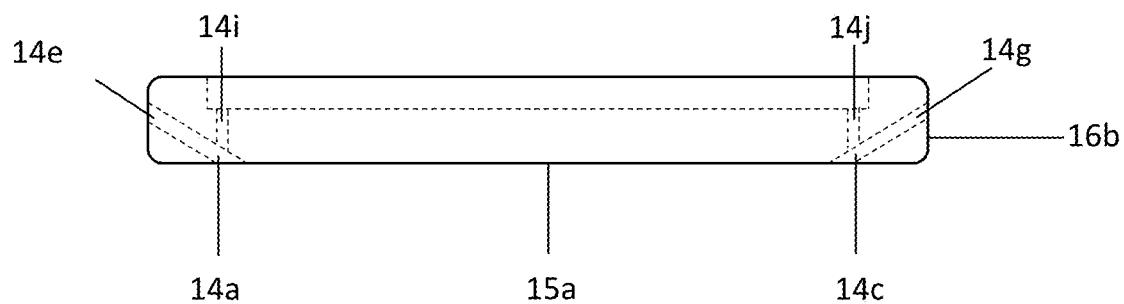
FIG. 8 shows an orthogonal view of the transport platform component of the attachment apparatus and/or system for securely attaching objects to a bicycle frame, in accordance with principles of the present disclosure.

FIG. 8 shows an orthogonal view of the base 11 of the transport platform 10 depicting the one or more holes used for drainage or for mounting the base 11 to the bicycle rack BR. In one embodiment of the transport platform 10, the cable ties or zip ties ZT may be inserted through one or more diagonal holes 14e, 14f, 14g, 14h on the first and second sides 16a, 16b of the base 11 that connect with corresponding holes 14a, 14b, 14c, 14d respectively, on the bottom surface of the base 11, as shown in FIG. 8. It should be noted that the one or more diagonal holes 14e, 14f, 14g, 14h on the first and second sides 16a, 16b of the base 11 preferably have a 45° angle. When the cable ties or zip ties ZT are inserted through the one or more diagonal holes in the aforementioned configuration they do not take up any of the space on the top surface of the base 11.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in any future claim.

What is claimed is:

1. An attachment apparatus for securely attaching objects to a bicycle frame, comprising:
    a transport platform configured to be attached to a bicycle rack;
    wherein the transport platform comprises a base with raised edges around its entire perimeter;
    wherein the base includes:
    a first end and a second end that are parallel to each other and have the same length,
    a first side and a second side that are parallel to each other and have the same length, and
    wherein the length of the first and second sides of the base is greater than the length of the first and second ends of the base;
    wherein the base further includes one or more holes that cross through the surface of the base;
    a single piece rail configured to be mechanically inserted or fitted into grooves at the bottom of the base;
    wherein the rail includes:
    a first end and a second end that are parallel to each other and have the same length,
    a first side and a second side that are parallel to each other and have the same length,
    wherein the length of the first and second sides of the rail is greater than the length of the first and second ends of the rail;
    wherein the rail protrudes or extends beyond the perimeter of the first and second sides of the base, thus creating a cavity between the corresponding first and second sides of the base and the corresponding first and second sides of the rail;

at least one connecting strap, having a first end and a second end opposite to each other;

wherein first end of the connecting strap is fastened to the base via a first snap fastener;

wherein the first end of the connecting strap is folded over the rail;

wherein the second end of the connecting strap is looped over an attachment point in the bicycle rack, such that the midpoint of the connecting strap is securely attached to the bicycle rack;

wherein the second end of the connecting strap is folded over the rail;

wherein the second end of the connecting strap is fastened to the base via a second snap fastener;

wherein the aforementioned configuration of the connecting strap creates a triangular shape that is capable of holding a U-shaped lock in place in the x, y and z dimensions and preventing said U-shape lock from moving and rattling.

2. The attachment apparatus of claim 1, wherein the one or more holes are configured to receive one or more cable ties in order to secure the transport platform to the bicycle rack.

3. The attachment apparatus of claim 1, further comprising one or more diagonal holes on the first and second sides of the base that connect with corresponding holes on the bottom surface of the base.

4. The attachment apparatus of claim 3, wherein the one or more diagonal holes are configured to receive one or more cable ties in order to secure the transport platform to the bicycle rack.

5. The attachment apparatus of claim 1, wherein the one or more holes are configured to serve as drainage for the base.

6. The attachment apparatus of claim 1, further comprising a saddlebag or pannier attached to the transport platform.

7. The attachment apparatus of claim 1, further comprising a locking container attached to the base via the snap fasteners.

8. The attachment apparatus of claim 1, further comprising a storage container attached to the base via the snap fasteners.

9. The attachment apparatus of claim 1, further comprising a light bracket attached to the first end of the base.

10. The attachment apparatus of claim 9, further comprising a rear light attached to the light bracket.

11. The attachment apparatus of claim 1, wherein the rail includes at least one strap for providing friction.

12. The attachment apparatus of claim 1, wherein the base is rectangular in shape.

13. The attachment apparatus of claim 12, wherein the base has rounded edges.

14. The attachment apparatus of claim 1, wherein the rail is rectangular in shape.

15. The attachment apparatus of claim 14, wherein the rail has rounded edges.

* * * * *